(12) United States Patent
Seis et al.

(10) Patent No.: US 10,518,866 B2
(45) Date of Patent: Dec. 31, 2019

(54) CONTROL SURFACE ELEMENT FOR AN AIRPLANE

(71) Applicant: FACC AG, Ried im Innkreis (AT)

(72) Inventors: Michael Seis, Ebreichsdorf (AT); Martin Meindlhumer, Bad Schallerbach (AT)

(73) Assignee: FACC AG, Ried im Innkreis (AT)

( * ) Notice: Subject to any disclaimer, the term of this patent is extended or adjusted under 35 U.S.C. 154(b) by 319 days.

(21) Appl. No.: 15/503,105

(22) PCT Filed: Aug. 11, 2015

(86) PCT No.: PCT/AT2015/050196
§ 371 (c)(1),
(2) Date: Feb. 10, 2017

(87) PCT Pub. No.: WO2016/023056
PCT Pub. Date: Feb. 18, 2016

(65) Prior Publication Data
US 2017/0233061 A1    Aug. 17, 2017

(30) Foreign Application Priority Data

Aug. 11, 2014 (AT) .............................. A 50557/2014

(51) Int. Cl.
*B64C 9/32* (2006.01)
*B64C 9/16* (2006.01)

(52) U.S. Cl.
CPC ................ *B64C 9/323* (2013.01); *B64C 9/16* (2013.01)

(58) Field of Classification Search
CPC .................................. B64C 9/323; B64C 9/16
See application file for complete search history.

(56) References Cited

U.S. PATENT DOCUMENTS 5,224,670 A * 7/1993 Padden .................... B64C 3/20
                                                244/123.3
6,234,423 B1 * 5/2001 Hirahara ................... B64C 3/18
                                                244/123.7

(Continued)

FOREIGN PATENT DOCUMENTS

AT            409482 B      8/2002
AT            511113 B1     9/2013
(Continued)

OTHER PUBLICATIONS

ISA European Patent Office, International Search Report Issued in Application No. PCT/AT2015/050196, dated Oct. 27, 2015, WIPO, 4 pages.

(Continued)

*Primary Examiner* — Philip J Bonzell
(74) *Attorney, Agent, or Firm* — McCoy Russell LLP

(57) ABSTRACT

The invention relates to a control surface element for an airplane, in particular a spoiler, comprising a composite fiber element that has a surface around which air flows, a mounting device for movably mounting the composite fiber element on a structural component, and a reinforcing structure for reinforcing the composite fiber element. The reinforcing structure comprises at least one reinforcing element which is integrally formed with the composite fiber element. The reinforcing structure comprises a primary reinforcing element which is designed to receive main loads and which is connected to at least one secondary reinforcing element that is designed to receive secondary loads. The composite fiber element comprises a recess for integrally forming the primary reinforcing element.

20 Claims, 6 Drawing Sheets

(56) References Cited

U.S. PATENT DOCUMENTS

| | | | |
|---|---|---|---|
| 6,270,039 B1 | 8/2001 | Linjama | |
| 6,689,246 B2 * | 2/2004 | Hirahara | B64C 3/18 |
| | | | 156/242 |
| 7,631,840 B2 * | 12/2009 | Kallinen | B64C 9/02 |
| | | | 244/123.1 |
| 8,245,971 B2 | 8/2012 | Makela et al. | |
| 8,453,972 B2 * | 6/2013 | Billinger | B64C 9/02 |
| | | | 244/123.1 |
| 2001/0017336 A1 | 8/2001 | Hirahara et al. | |
| 2002/0100840 A1 | 8/2002 | Billinger et al. | |
| 2009/0072090 A1 | 3/2009 | Kallinen et al. | |
| 2013/0011605 A1 | 1/2013 | Miller | |
| 2014/0001682 A1 | 1/2014 | Schneiderbauer et al. | |
| 2016/0362172 A1 * | 12/2016 | Axford | B64C 9/00 |

FOREIGN PATENT DOCUMENTS

| | | | |
|---|---|---|---|
| EP | 1227035 A2 | 7/2002 | |
| EP | 1181149 B1 | 12/2003 | |
| EP | 2862798 A2 | 4/2015 | |
| RU | 2184682 C1 | 7/2002 | |

OTHER PUBLICATIONS

International Bureau of WIPO, International Preliminary Report on Patentability Issued in Application No. PCT/AT2015/050196, dated Feb. 23, 2017, WIPO, 9 pages.
Intellectual Property Office of Singapore, Office Action Issued in Application No. 11201700938Q, dated Oct. 30, 2017, 7 pages.

* cited by examiner

CONTROL SURFACE ELEMENT FOR AN AIRPLANE

CROSS-REFERENCE TO RELATED APPLICATIONS

The present application is a U.S. National Phase of International Patent Application Serial No. PCT/AT2015/050196, entitled "CONTROL SURFACE ELEMENT FOR AN AIRPLANE," filed on Aug. 11, 2015. International Patent Application Serial No. PCT/AT2015/050196 claims priority to Austrian Patent Application No. A 50557/2014, filed on Aug. 11, 2014. The entire contents of each of the above-cited applications are hereby incorporated by reference for all purposes.

TECHNICAL FIELD

The invention relates to a control surface element for an airplane, in particular a spoiler, comprising a composite fiber element that has a surface around which air flows, a mounting device for movably mounting the composite fiber element on a structural component, and a reinforcing structure for reinforcing the composite fiber element, wherein the reinforcing structure comprises at least one reinforcing element which is integrally formed with the composite fiber element.

BACKGROUND AND SUMMARY

From U.S. Pat. No. 8,245,971 B2, a control surface in which the external and internal sides are each embodied with one reinforcing structure has become known. The reinforcements are integrated into the surfaces of the control surface. The control surface is formed by an external plate and an internal plate which are prefabricated, for example, by RTM (Resin Transfer Molding). In this prior art, long stretched-out profiles of the external and/or internal plate which extend at the external and/or internal plate essentially at right angles with respect to each other are provided as reinforcements.

The known design, however, is directed to the introduction of uniformly distributed loads which are essentially diverted linearly at the edges of the component. However, the known design is not very well suited for diverting non-uniformly distributed loads with a weight-optimized design. Therefore, the known design is disadvantageous in that the arrangement of the reinforcements is not optimally adapted to non-uniform loads in aviation. It in particular turned out to be disadvantageous that the load introduction through the mounting of the control surface at the airplane's wing is not sufficiently provided for. Moreover, a comparatively high number of reinforcements is required which increase fabrication efforts and weight in a disadvantageous manner.

AT 409 482 B discloses a spoiler which comprises fittings with two bearings and a joint. Moreover, reinforcing structures radially emerging from the joint are provided. The spoiler may be manufactured by resin transfer molding in one operation with the fittings as composite fiber part. However, this spoiler has a comparatively high weight.

In U.S. 6,270,039 B1, fittings for connecting a control surface to the wing of an airplane are described.

US 2009072090 A1 and US 2013/011605 A1 show control surfaces with different reinforcing elements.

Accordingly, the object of the present invention is to alleviate or eliminate the disadvantages of prior art.

This object is achieved by a control surface element for an airplane comprising a composite fiber element that has a surface around which air flows, a mounting device for movably mounting the composite fiber element on a structural component, and a reinforcing structure for reinforcing the composite fiber element, wherein said reinforcing structure comprises at least one reinforcing element which is integrally formed with the composite fiber element, wherein said reinforcing structure comprises a primary reinforcing element which is designed to receive main loads and which is connected to at least one secondary reinforcing element that is designed to receive secondary loads, wherein said composite fiber element comprises a recess for integrally forming said primary reinforcing element. Preferred embodiments are indicated in the depending claims.

According to the invention, the reinforcing structure comprises a primary reinforcing element which is designed to receive main loads and which is connected to at least one secondary reinforcing element that is designed to receive secondary loads, the composite fiber element comprises a recess for integrally forming the primary reinforcing element.

Therefore, the invention is based on the fact that the forces introduced into the composite fiber element via the mounting device in operation are not, as in prior art, received by several similar reinforcements, but that according to the invention, the main load is transmitted to a primary reinforcing element which is connected to at least one secondary reinforcing element for receiving secondary loads. According to the invention, the composite fiber element is adapted for a distribution of forces from the mounting device over the primary reinforcing element to the secondary reinforcing element. The primary reinforcing element is embodied as a central reinforcement of the control surface element which reinforcement forms the backbone of the control surface element. To this end, the primary reinforcing element preferably comprises a long stretched-out shape, wherein the secondary reinforcing element is embodied to be weaker than the primary reinforcing element to receive the loads reduced by the primary reinforcing element. To this end, the primary reinforcing element may comprise a larger width and/or height than the secondary reinforcing element. Preferably, several, in particular many, secondary reinforcing elements are provided and are in particular arranged on opposite sides, i.e. towards the front and rear longitudinal side of the composite fiber element. The reinforcing structure with the various reinforcing elements is made of fiber-reinforced plastics.

For an integral embodiment of the primary reinforcing element at the control surface element, the composite fiber element comprises a recess according to the invention. Thereby, a particularly light design may be achieved without compromising the stiffness of the control surface element. For the purposes of the present disclosure, the integral or one-piece embodiment of the reinforcing element means that the reinforcing element is manufactured together with the composite fiber element in a composite fiber structure. In contrast, with a two-piece design, separate composite fiber components are produced which are then connected to each other in a suited manner, for example by adhesive joints.

In the course of extensive theoretical examinations, the design according to the invention surprisingly turned out to be particularly advantageous when it comes to withstanding forces arising in aviation. The control surface element according to the invention in particular permits to transfer non-uniformly distributed loads with a weight-optimized design. Furthermore, load transmission may be effected concentrated on one or several points. It is moreover an advantage that the number of required reinforcing elements may be essentially reduced. Thereby, fabrication efforts may be reduced on the one hand. On the other hand, a particularly weight-saving construction may be achieved which allows for the aircraft manufacturers' constant efforts to reduce fuel consumption. By the integration of at least one of the reinforcing elements, in particular the primary reinforcing element, into the manufacture of the control surface element, fabrication efforts may be advantageously reduced. Moreover, the coherence of the control surface element, in particular in case of major damages, may be reinforced. Thereby, an essential advantage over well-known sandwich constructions with a honeycomb core is achieved. For integrally embodying the at least one reinforcing element, in particular the primary reinforcing element, in the control surface element, in particular the RTM method (Resin Transfer Molding), the method of EP 1 181 149 B1, or the method described in AT 511 113 B may be employed. The embodiment of the control surface element according to the invention is particularly suited for a brake flap (spoiler) which represents one embodiment of a spoiler. The subject matter of the invention is basically suited for further different types of control surfaces, such as aileron, horizontal stabilizer or vertical stabilizer.

To design the primary reinforcing element for higher loads than the secondary reinforcing element, it is advantageous for the primary reinforcing element to comprise a larger width and/or height than the secondary reinforcing element. Accordingly, the loads received in the region of the mounting device are mainly absorbed by the primary reinforcing element which to this end is embodied to be correspondingly stronger than the secondary reinforcing element.

Mainly in case the control surface element is designed as a spoiler, it is advantageous for the mounting device to comprise a mounting element provided essentially centrically at a front longitudinal edge of the composite fiber element which mounting element is adjoined by a central section of the primary reinforcing element. The mounting element is, as is common in prior art, designed to be pivotally mounted at the structural component which, in case of the brake flap, is formed by the airplane's wing box. Such a mounting element in the form of fittings is described in AT 409 482 B. The mounting element is preferably made of a composite fiber material, for example by Resin Transfer Molding (RTM). By arranging the central section of the primary reinforcing element directly adjacent to the mounting element, the loads occurring in this region may be reliably received, secondary loads being introduced into the secondary reinforcing element. To this end, only the primary reinforcing element, but not the secondary reinforcing element, is connected to the central mounting element of the control surface element. Moreover, the mounting device may, as is also common in prior art, comprise further mounting elements at the lateral ends of the front longitudinal edge of the composite fiber element which mounting elements are adjoined by preferably at least one reinforcing element, in particular a secondary reinforcing element.

To laterally remove the main loads acting on the mounting element, it is advantageous for the primary reinforcing element to comprise side sections extending from the central section towards narrow sides of the composite fiber element. For the distribution of the main loads, it is advantageous for the primary reinforcing element to extend at the side sections rearwards, starting from the central section, i.e. away from the front longitudinal edge of the composite fiber element. The primary reinforcing element may be arcuate at the side sections. As an alternative, the primary reinforcing element may comprise linearly extending longitudinal sides.

To distribute forces in the composite fiber element as uniformly as possible, it is advantageous for the side sections of the primary reinforcing element to end adjacent to the narrow sides of the composite fiber element. Accordingly, the main loads are introduced at the central section adjacent to the mounting element and transferred via the primary reinforcing element in the direction of the narrow sides of the control surface element.

Load distribution in the control surface element may be advantageously allowed for if the primary reinforcing element is adapted for receiving higher loads at the central section than at the side sections.

To this end, it is advantageous for the central section of the primary reinforcing element to comprise a larger width and/or height than the side sections of the primary reinforcing element.

Moreover, continuous load transfer may be advantageously effected if the width and/or height of the primary reinforcing element is diminishing outwards at the side sections.

According to a particularly preferred embodiment, the secondary reinforcing element is embodied as a junction of the primary reinforcing element. Accordingly, the secondary reinforcing element branches off like a rib from the primary reinforcing element embodied as a backbone of the reinforcing structure. The secondary reinforcing element may comprise a T-, L-, U- or l-shaped cross-section.

Moreover, the load distribution in the control surface element may be allowed for even more precisely if at least one tertiary reinforcing element is provided as junction of the secondary reinforcing element. The tertiary reinforcing element is weaker than the secondary reinforcing element. To this end, the tertiary reinforcing element may comprise a lower height and/or width than the secondary reinforcing element.

According to a preferred embodiment, the central section of the primary reinforcing element is connected; on a back facing away from the mounting element; with two secondary reinforcing elements arranged essentially in a V-shaped manner and diverging in the direction of the rear longitudinal edge of the composite fiber element. In this embodiment, the flow of forces is therefore received on the back of the primary reinforcing element, split onto the two secondary reinforcing elements diverging in a V-shaped manner and transferred rearwards.

To adapt to the load profile occurring in case of loads it is advantageous for the height and/or width of the secondary reinforcing elements arranged in a V-shape to diminish towards the rear longitudinal edge of the composite fiber element. Thereby, moreover a particularly space-saving design may be created by which the installation situation is considered.

To absorb the remaining loads, it is advantageous if at least one tertiary reinforcing element each projects inwards from the secondary reinforcing elements arranged in a V-shape at the back of the primary reinforcing element. These tertiary reinforcing elements are preferably arranged in a manner converging essentially in a V-shape in the direction of the rear longitudinal edge of the composite fiber element. Thereby, a double-V reinforcing structure is obtained which is particularly suited for compensating loads in the direction of the shorter extension of the control surface element (i.e. in the transverse direction).

According to an alternative preferred embodiment, at least one secondary reinforcing element essentially extending in parallel to the primary reinforcing element is provided and connected to the primary reinforcing element via a connection web in particular extending in the transverse direction of the composite fiber element. In this embodiment, the secondary reinforcing element is shaped corresponding to the primary reinforcing element, however, in view of the lower load absorbing capacity, it has a smaller width and/or height. The connection web permits load transfer between the primary and the secondary reinforcing elements, wherein the connection web preferably extends in the transverse direction of the control surface element, i.e. in case of a brake flap essentially in the direction of flight.

To reinforce the in particular plate-like control surface elements, it is in this embodiment particularly advantageous to provide two arcuate secondary reinforcing elements with a height diminishing towards the rear longitudinal edge which are connected to each other and to the primary reinforcing element via a connection web tapering like a wedge towards the rear longitudinal edge.

To integrally embody the primary reinforcing element at the control surface element, it is advantageous for the composite fiber element to comprise a recess. For the purposes of the present disclosure, the integral or one-piece embodiment of the reinforcing element means that the reinforcing element is manufactured together with the composite fiber element in a composite fiber structure. In contrast, with a two-piece design, separate composite fiber components are produced which are then connected to each other in a suited manner, for example by adhesive joints.

Correspondingly, it is advantageous for the composite fiber element to comprise an indentation for the integral embodiment of the at least one secondary reinforcing element. It is particularly preferred for all primary and secondary reinforcing elements to be integrally formed with the tabular or plate-like composite fiber element, i.e. during the same process or with simultaneous curing. Individual secondary reinforcing elements, however, may also be provided as separate components, in particular composite fiber components, which are connected to the plate-like composite fiber element, for example by an adhesive joint.

In view of an integral construction, it is moreover advantageous for the mounting element to be integrally formed with the composite fiber element for a movable connection with the structural component.

To achieve the control surface element, it is advantageous for the composite fiber element to comprise a lower skin with the reinforcing structure and an upper skin with the surface around which air flows. In this case, the upper skin is designed to be tabular or plate-like. The lower skin is also tabular or plate-like, wherein the reinforcing structure in particular projects therefrom in the form of recesses or indentations. The lower and upper skins are prefabricated as composite fiber components and then connected to each other in a suited manner by adhesive joints or mechanical connections, respectively. In this embodiment, it is advantageous if only the lower skin comprises the reinforcing elements, while the upper skin is free from reinforcing elements. Thereby, a particularly simple design may be created.

BRIEF DESCRIPTION OF THE FIGURES

The invention will be further illustrated below with reference to preferred embodiments, to which, however, it shall not be restricted. In the drawing.

DETAILED DESCRIPTION

Figure 1:
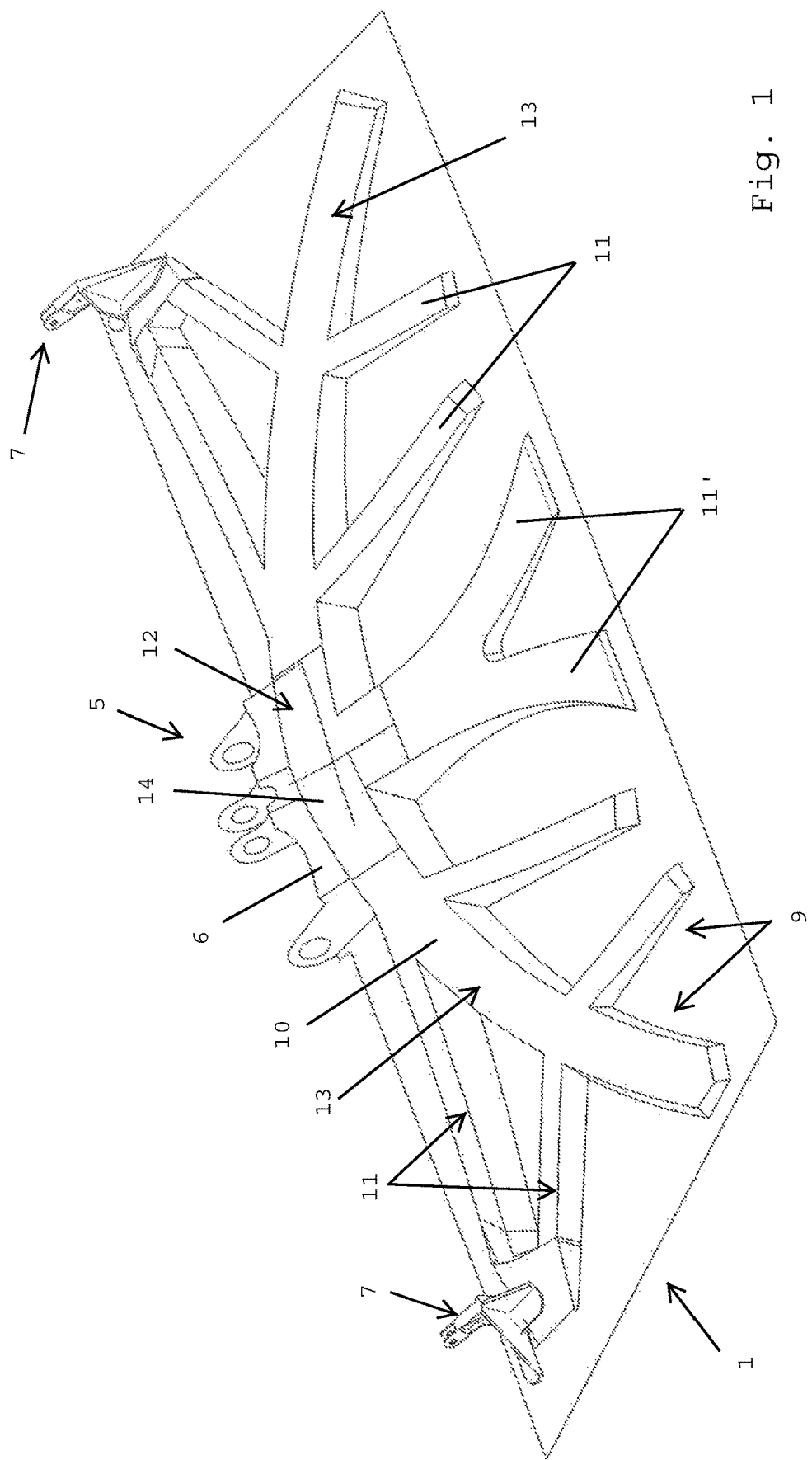
FIG. 1 shows a diagrammatic view of the bottom side of a lower skin made of fiber-reinforced plastic material for a control surface element according to the invention, wherein a reinforcing structure with an oblong primary reinforcing element of the type of a backbone is visible from which various secondary reinforcing elements are branched off.
Figure 2:
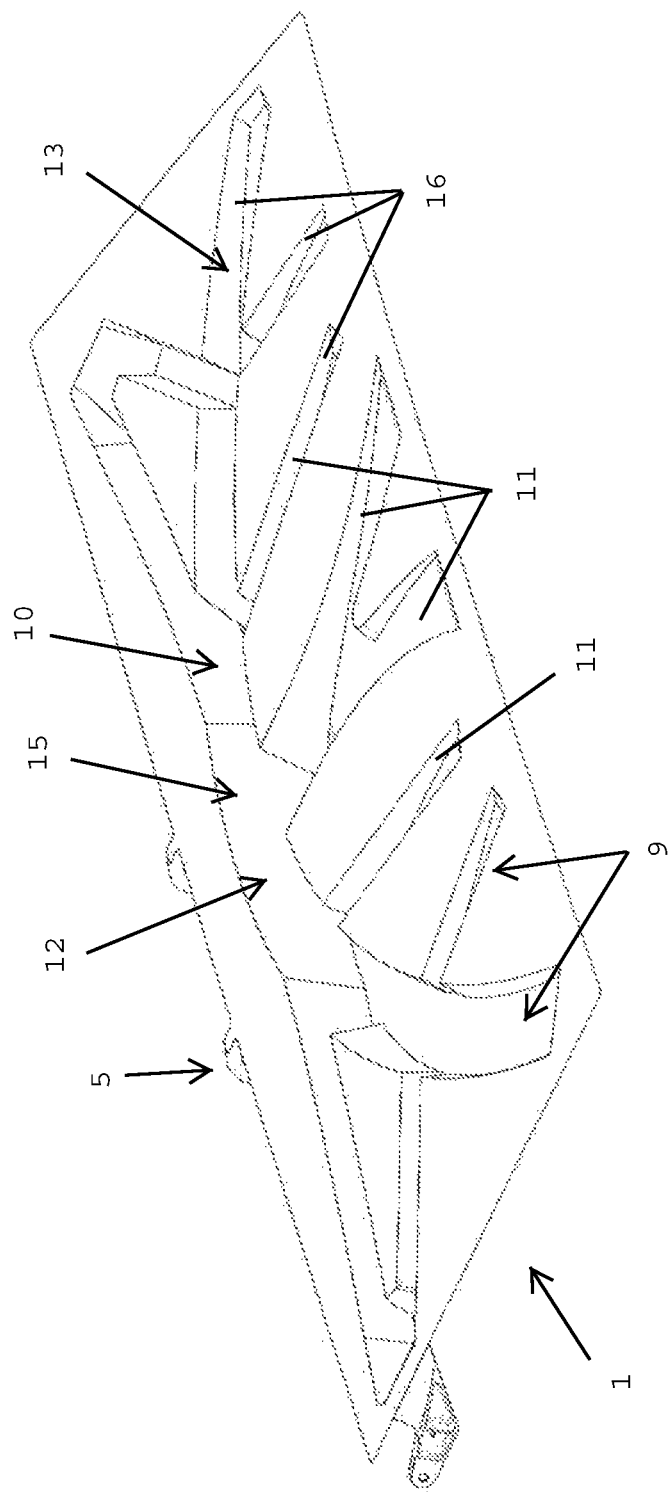
FIG. 2 shows a diagrammatic view of the upper side of the lower skin shown in FIG. 1, wherein the integral design of the primary and secondary reinforcing elements is visible as indentations of the skin.
Figure 3:
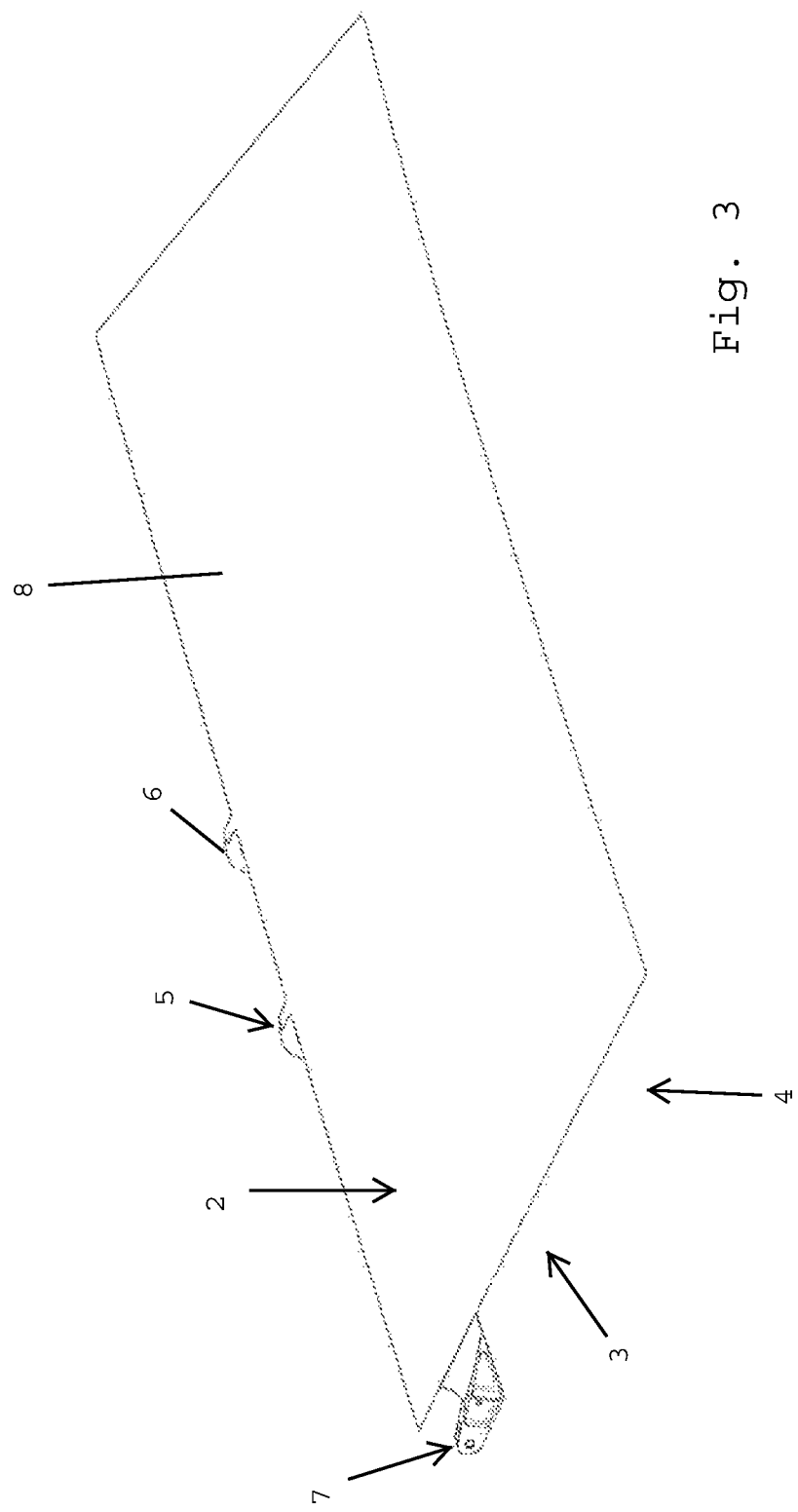
FIG. 3 shows a diagrammatic view of the control surface element according to the invention according to FIGS. 1, 2 with a view onto an upper skin.

In FIGS. 1 to 3, a first embodiment of a lower skin 1 is shown which forms, together with an upper skin 2 (cf. FIG. 3), a composite fiber element 3 for a control surface element 4 in aircraft construction. The upper and lower skins are made of fiber-reinforced plastics, for example by RTM. In the shown embodiment, the control surface element 4 is embodied as a spoiler for an airplane. Corresponding embodiments, however, may also be provided for other surfaces of airplanes around which air flows (for example control surfaces). The control surface element 4 comprises a mounting device 5 for an articulated mounting of the composite fiber element 3 on a structural component, i. e. a wing box of an airplane. The mounting device 5 comprises a mounting element 6 which is centrically provided at a front longitudinal edge of the composite fiber element. The terms "front", "rear", "top", "bottom" relate, for the purposes of this disclosure, to the intended operating state of the control surface element 4.

The control surface element is essentially rectangular in a plan view (cf. FIG. 3), so that a longitudinal extension (with the spoiler in the direction of the wing's axis) and a transverse extension (with the spoiler essentially perpendicular to the wing's axis) are formed. The mounting device 5 comprises further mounting elements 7 laterally at the front edge. Since the design of the mounting device 5 is well-known in prior art, more detailed illustrations thereof may be omitted (cf. for example AT 409 482 B). At the upper side of the control surface element 4, an aerodynamic, essentially plane surface 8 around which air flows is provided and formed by the upper side of the upper skin 2.

As can be seen in FIGS. 1, 2, the lower skin 1 comprises a reinforcing structure 9 for reinforcing the composite fiber element 3. The reinforcing structure 9 comprises various reinforcing elements which will be illustrated more in detail below. At least one reinforcing element is integrally formed with the composite fiber element 3, i.e. in the same manufacturing process, with simultaneous curing.

As can be further seen in FIGS. 1, 2, the reinforcing structure 9 comprises a primary reinforcing element 10 which is connected to several secondary reinforcing elements 11 designed to receive secondary loads. The primary reinforcing element 10 comprises a larger width for receiving the main load than the secondary reinforcing elements 11. The width here relates to the shorter extension of the oblong primary and/or secondary reinforcing elements 10, 11. The primary reinforcing element 10 comprises a central section 12 which directly adjoins the central mounting element 6 at the front edge of the control surface element 4. Moreover, the primary reinforcing element 10 comprises two side sections 13 which extend, starting from the central section 12, towards the narrow sides (i.e. the shorter sides) of the lower skin 1. In the shown embodiment, the side sections 13 of the primary reinforcing element 10 end adjacent to the narrow sides of the lower skin 1 of the control surface element 4.

To provide the primary reinforcing element 10 at the central section 12 for receiving higher loads than at the side sections 13, the height of the primary reinforcing element 10 diminishes from the central section 12 outwards. Moreover, the primary reinforcing element 10 comprises, in the shown embodiment, a convex bulge 14 at the central section 12 which bulge is adapted to the shape of the central mounting element 6. The secondary reinforcing elements 11 are embodied as junctions of the primary reinforcing element 10 which start from the central section 12 and from the side sections 13.

In the embodiment according to FIGS. 1 to 3, the central section 12 of the primary reinforcing element 10 is connected, on a back facing away from the mounting element 6, with two secondary reinforcing elements 11' essentially arranged in a V-shape and diverging in the direction of the rear longitudinal edge of the composite fiber element 3. These forked secondary reinforcing elements 11' cause load transmission in the transverse direction of the control surface element 4. The height of the secondary reinforcing elements 11' arranged in a V-shape diminishes towards the rear longitudinal edge of the composite fiber element 3.

As can be seen in FIG. 2, the lower skin 1 of the composite fiber element 3 comprises a recess 15 for integrally forming the primary reinforcing element. Correspondingly, the lower skin 1 of the composite fiber element 1 comprises corresponding indentations 16 for integrally forming the secondary reinforcing elements 11. Accordingly, the lower skin 1 comprises an essentially constant wall thickness in the region of the reinforcing structure 9. In the shown embodiment, all reinforcing elements 10, 11 are integrally formed at the lower skin 1. Moreover, the central mounting element 6 may be also integrally formed with the lower skin 1 for the movable connection with the airplane's wing. The further mounting elements 7 at the sides are, in the shown embodiment, attached as fittings, in particular of metal, at the bottom side of the lower skin 1.

Figure 4:
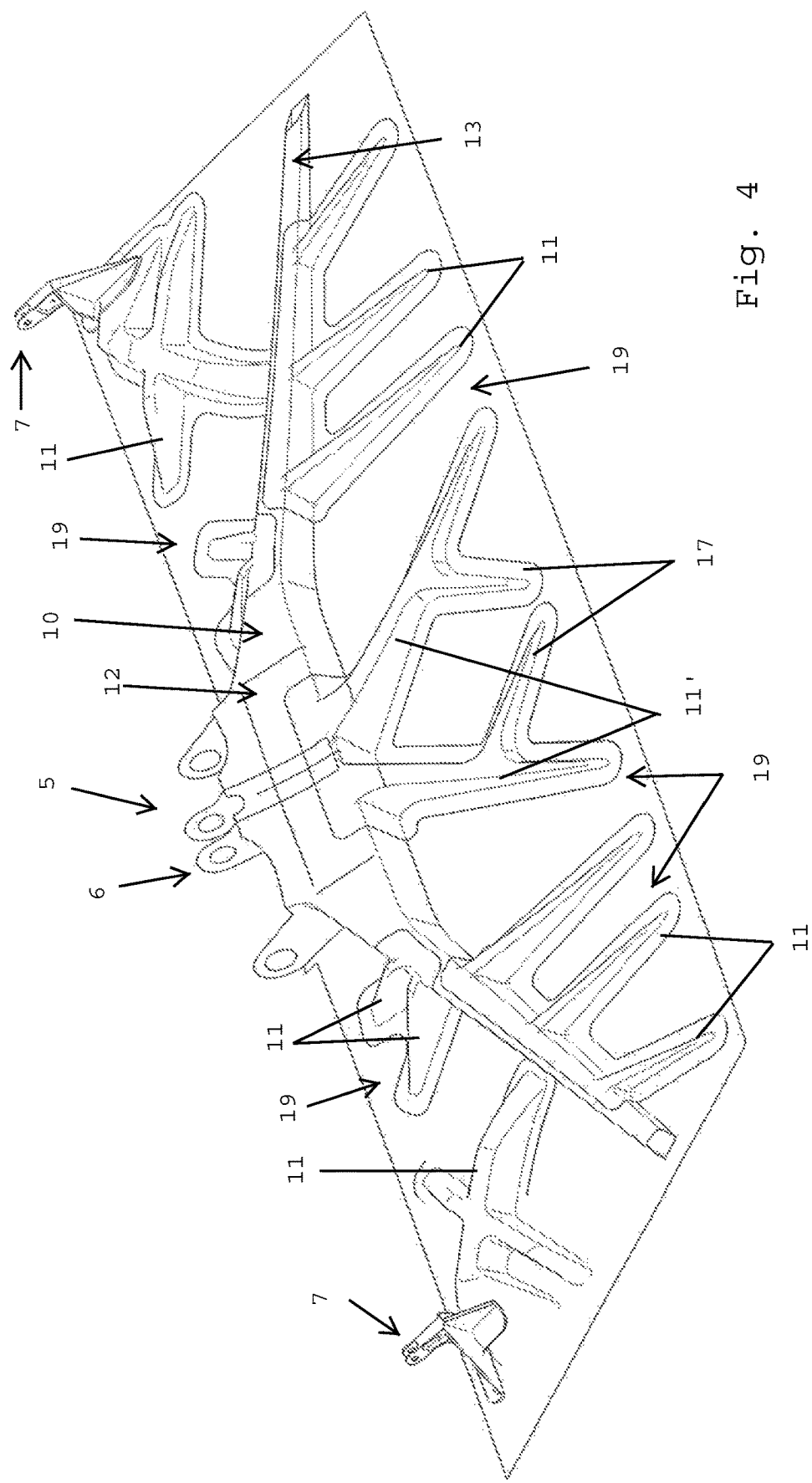
FIG. 4 shows a diagrammatic view of an alternative embodiment of the lower skin, wherein the primary reinforcing element is linearly tapering outwards starting from an enlarged central section.

FIG. 4 shows an alternative embodiment of the lower skin 1.

In this embodiment, V-shaped or forked secondary reinforcing elements 11' are also provided at the back of the central section 12 of the primary reinforcing element 10. Moreover, in this embodiment, exactly one tertiary reinforcing element 17 each projects inwards from the secondary reinforcing elements 11' arranged in a V-shape. The tertiary reinforcing elements 17 are therefore embodied as junctions of the V-shaped secondary reinforcing element 11'. The back of the central section 12 of the primary reinforcing element 10 is here arranged linearly, in the longitudinal direction of the control surface element 4. The width or the transverse extension and the height or the vertical extension of the primary reinforcing element 10 continuously diminishes at the side sections 13 to the outside.

As can be further seen in FIG. 4, in this embodiment, separate composite fiber components 19 are provided for forming one group of secondary reinforcing elements 11 each. The composite fiber components 19 are connected, in a suited manner, in particular by adhesive joints, with the lower skin 1 at which the primary reinforcing element 10 is integrally formed.

Figure 5:
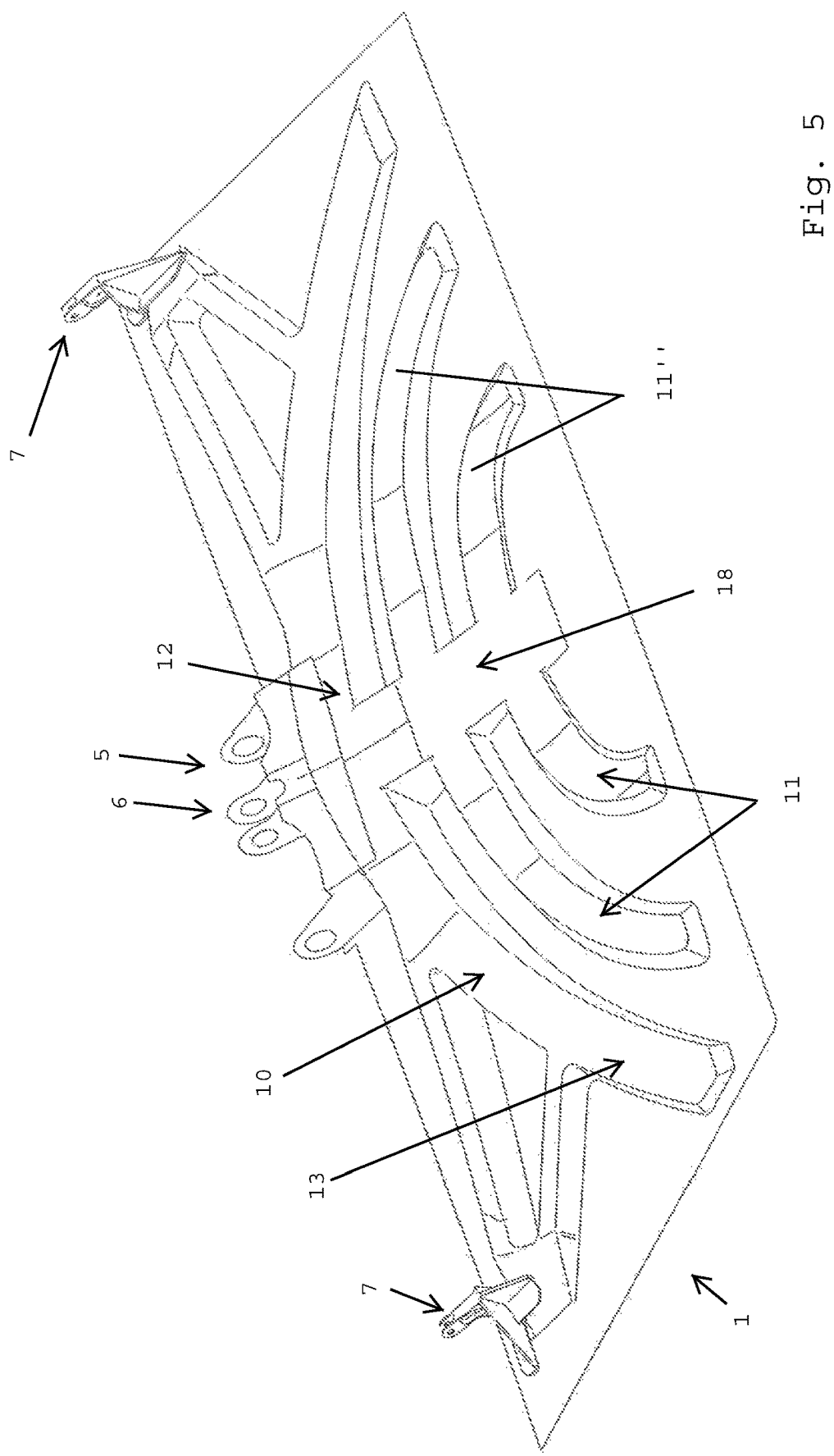
FIG. 5 shows a diagrammatic view of a further alternative embodiment of the lower skin with an arcuate primary reinforcing element which is connected with two equally arcuate secondary reinforcing elements via a wedge-shaped connection web.

FIG. 5 shows a further embodiment of the lower skin 1 wherein an arcuate primary reinforcing element 10 is provided. Moreover, two secondary reinforcing elements 11" essentially extending in parallel to the primary reinforcing element and also being arcuate are provided and connected to the primary reinforcing element 10 via a connection web 18 extending in the transverse direction of the control surface element 4. The two arcuate secondary reinforcing elements 11" comprise a height diminishing towards the rear longitudinal edge. Moreover, the connection web 18 is designed to taper towards the rear longitudinal edge.

Figure 6:
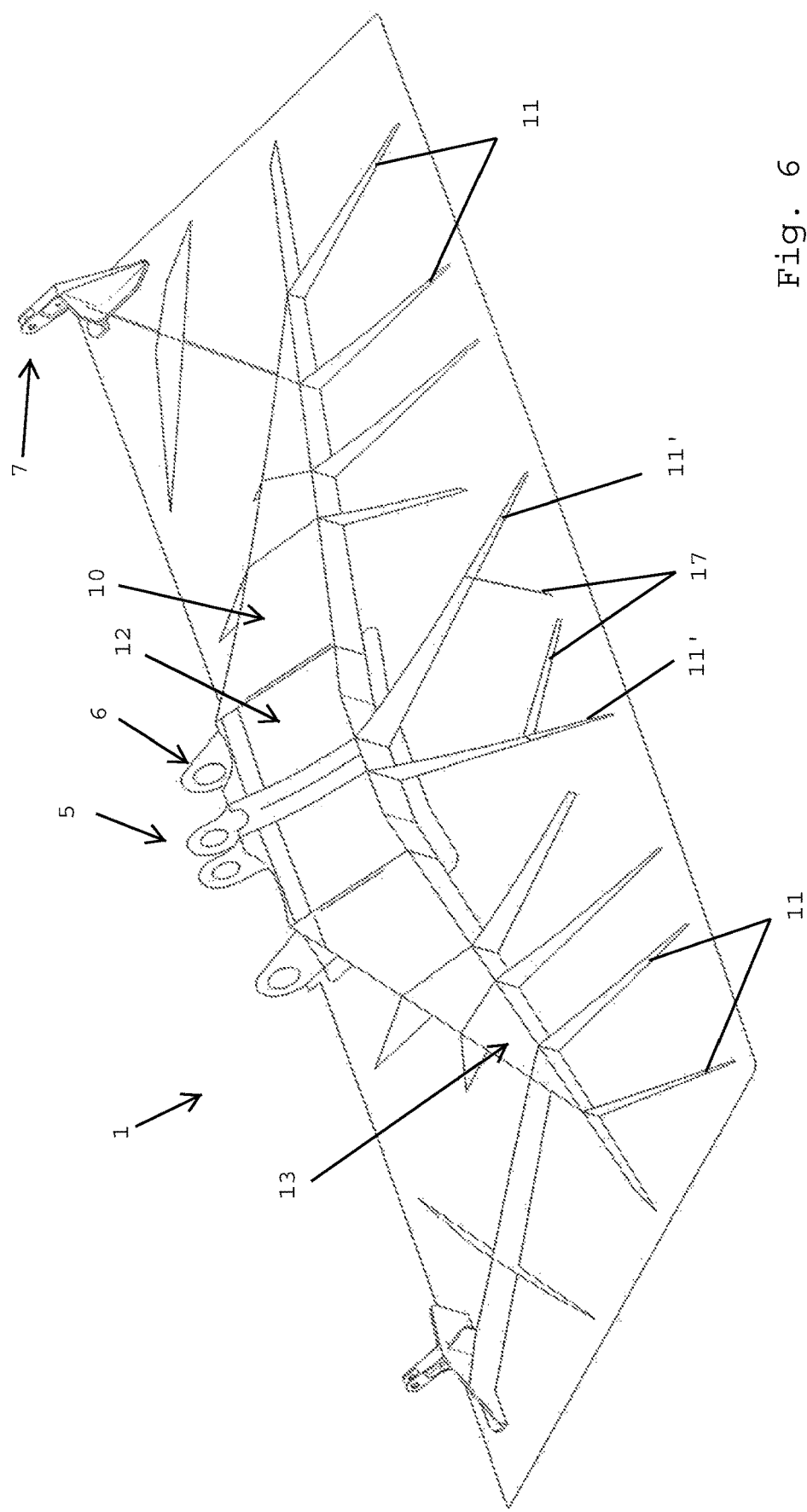
FIG. 6 shows a diagrammatic view of a further embodiment of the lower skin wherein the primary reinforcing element converges outwards like a wedge at the side sections and wherein web-like secondary reinforcing elements are provided.

FIG. 6 shows a further embodiment of the lower skin 1 wherein the primary reinforcing element 10 converges like a wedge towards the narrow sides of the control surface element. Moreover, various web- or wall-shaped secondary reinforcing elements 11 are provided which adjoin the primary reinforcing element 10. As in the embodiment of FIG. 4, the secondary reinforcing elements 11 arranged in a V-shape are connected to tertiary reinforcing elements 17. In this embodiment, the secondary reinforcing elements 11, which may also have an I-shaped, an L-shaped or a T-shaped cross-section, have a full cross-section, in contrast to the previously described secondary reinforcing elements 11 in the form of indentations of the lower skin 1. The secondary reinforcing elements 11 are formed at the composite fiber element preferably integrally or in one piece.

The invention claimed is:

1. A control surface element for an airplane, comprising:
a composite fiber element that has a surface around which air flows;
a mounting device for movably mounting the composite fiber element on a structural component;
a reinforcing structure for reinforcing the composite fiber element;
wherein said structure comprises a primary reinforcing element which is designed to receive main loads and which is connected to at least one secondary reinforcing element that is designed to receive secondary loads;
wherein said primary reinforcing element and the secondary reinforcing element are integrally formed with the composite fiber element;
wherein said composite fiber element has a recess which integrally forms said primary reinforcing element; and
wherein the secondary reinforcing element branches off like a rib from the primary reinforcing element which is embodied as a backbone of the reinforcing structure.

2. The control surface element according to claim 1, wherein said primary reinforcing element comprises a larger width and/or height than the secondary reinforcing element.

3. The control surface element according to claim 1, wherein said secondary reinforcing element is embodied as a junction of said primary reinforcing element.

4. The control surface element according to claim 1, wherein said composite fiber element comprises an indentation for integrally forming said at least one secondary reinforcing element.

5. The control surface element according to claim 1, wherein said composite fiber element comprises a lower skin with said reinforcing structure and an upper skin with said surface around which air flows.

6. The control surface element according to claim 1, wherein the control surface element is a spoiler.

7. The control surface element according to claim 1, wherein said mounting device comprises a mounting element provided centrically at a front longitudinal edge of said composite fiber element, which mounting element is adjoined by a central section of said primary reinforcing element.

8. The control surface element according to claim 7, wherein a width and/or height of said primary reinforcing element diminishes at side sections of the primary reinforcing element outwards.

9. The control surface element according to claim 7, wherein said mounting element is integrally formed with said composite fiber element for movably connecting it to the structural component.

10. The control surface element according to claim 7, wherein said primary reinforcing element comprises side sections extending from said central section towards narrow sides of said composite fiber element.

11. The control surface element according to claim 10, wherein said side sections of said primary reinforcing element end adjacent to the narrow sides of said composite fiber element.

12. The control surface element according to claim 10, wherein said primary reinforcing element is provided at said central section for receiving higher loads than at the side sections.

13. The control surface element according to claim 12, wherein said central section of said primary reinforcing element comprises a larger width and/or height than the side sections of said primary reinforcing element.

14. The control surface element according to claim 7, wherein said central section of said primary reinforcing element is connected, at a back facing away from said mounting element, with two secondary reinforcing elements arranged in a V-shape and diverging in a direction of a rear longitudinal edge of said composite fiber element.

15. The control surface element according to claim 14, wherein a height and/or width of said secondary reinforcing elements arranged in the V-shape diminishes towards the rear longitudinal edge of said composite fiber element.

16. The control surface element according to claim 15, wherein at least one tertiary reinforcing element projects inwards from said secondary reinforcing elements arranged in the V-shape at the back of said primary reinforcing element.

17. The control surface element according to claim 1, wherein at least one tertiary reinforcing element is provided as a junction of said secondary reinforcing element.

18. The control surface element according to claim 17, wherein a central section of said primary reinforcing element is connected, at a back facing away from a mounting element, with two secondary reinforcing elements arranged in a V-shape and diverging in a direction of a rear longitudinal edge of said composite fiber element.

19. The control surface element according to claim 1, wherein at least one secondary reinforcing element extending essentially in parallel to said primary reinforcing element is provided and connected, via a connection web extending in particular in the transverse direction of said composite fiber element, to the primary reinforcing element.

20. The control surface element according to claim 19, wherein two arcuate secondary reinforcing elements with a height diminishing towards a rear longitudinal edge of the composite fiber element are provided and are connected to each other and to said primary reinforcing element via a connection web tapering towards the rear longitudinal edge like a wedge.

* * * * *